US006811864B2

(12) United States Patent
Czaplicki et al.

(10) Patent No.: US 6,811,864 B2
(45) Date of Patent: Nov. 2, 2004

(54) TACKY BASE MATERIAL WITH POWDER THEREON

(75) Inventors: Michael J. Czaplicki, Rochester, MI (US); Keith Madaus, Goodwells, MI (US)

(73) Assignee: L&L Products, Inc., Romeo, MI (US)

( * ) Notice: Subject to any disclaimer, the term of this patent is extended or adjusted under 35 U.S.C. 154(b) by 50 days.

(21) Appl. No.: 10/217,991

(22) Filed: Aug. 13, 2002

(65) Prior Publication Data

US 2004/0033344 A1 Feb. 19, 2004

(51) Int. Cl.$^7$ ............................ B32B 5/18; B32B 27/08; B32B 27/32; B32B 27/38
(52) U.S. Cl. ............................... 428/317.3; 428/317.1; 428/317.7; 428/413; 428/447; 428/474.4; 428/475.2; 428/476.3; 428/476.9; 428/477.4; 428/480; 428/483; 428/492; 428/493; 428/494; 428/500; 428/506; 428/516
(58) Field of Search ................................ 428/519, 520, 428/521, 522, 523, 524, 317.1, 317.3, 317.7, 413, 447, 474.4, 475.2, 476.3, 476.9, 477.4, 480, 483, 492, 493, 494, 500, 506, 516, 349, 355 EN, 355 BL, 355 CN; 521/143, 144, 146, 147, 149; 525/423, 438, 454, 481, 523

(56) References Cited

U.S. PATENT DOCUMENTS

| | | |
|---|---|---|
| 3,868,796 A | 3/1975 | Bush |
| 4,378,395 A | 3/1983 | Asoshina et al. |
| 4,427,481 A | 1/1984 | Smith et al. |
| 4,444,818 A | 4/1984 | Tominaga et al. |
| 4,610,836 A | 9/1986 | Wycech |
| 4,693,775 A | 9/1987 | Harrison et al. |
| 4,695,343 A | 9/1987 | Wycech |
| 4,732,806 A | 3/1988 | Wycech |
| 4,751,249 A | 6/1988 | Wycech |
| 4,769,391 A | 9/1988 | Wycech |
| 4,852,754 A | 8/1989 | Holdsworth et al. |
| 4,853,270 A | 8/1989 | Wycech |
| 4,898,630 A | 2/1990 | Kitoh et al. |
| 4,923,902 A | 5/1990 | Wycech |
| 4,995,545 A | 2/1991 | Wycech |
| 5,213,391 A | 5/1993 | Takagi |
| 5,266,133 A | 11/1993 | Hanley et al. |
| 5,288,538 A | 2/1994 | Spears |
| 5,358,397 A | 10/1994 | Ligon et al. |
| 5,373,027 A | 12/1994 | Hanley et al. |
| 5,470,886 A | 11/1995 | Makhlouf et al. |
| 5,712,317 A | 1/1998 | Makhlouf et al. |
| 5,806,919 A | 9/1998 | Davies |
| 5,948,508 A | 9/1999 | Pastore et al. |
| 5,964,979 A | 10/1999 | George et al. |
| 5,985,435 A | 11/1999 | Czaplicki et al. |
| 6,030,701 A | 2/2000 | Johnson et al. |
| 6,057,382 A | 5/2000 | Karim et al. |
| 6,099,948 A | 8/2000 | Paver, Jr. |
| 6,133,335 A | 10/2000 | Mahoney et al. |
| 6,153,302 A | 11/2000 | Karim et al. |
| 6,162,504 A | 12/2000 | Hubert et al. |
| 6,174,932 B1 | 1/2001 | Pachl et al. |
| 6,228,449 B1 | 5/2001 | Meyer |
| 6,232,433 B1 | 5/2001 | Narayan |
| 6,276,105 B1 | 8/2001 | Wycech |
| 6,277,898 B1 | 8/2001 | Pachl et al. |
| 6,287,669 B1 | 9/2001 | George et al. |
| 6,303,672 B1 | 10/2001 | Papalos et al. |
| 6,315,938 B1 | 11/2001 | Jandali |
| 6,319,964 B1 | 11/2001 | Blank et al. |
| 6,348,513 B1 | 2/2002 | Hilborn et al. |
| 6,372,334 B1 | 4/2002 | Wycech |
| 6,422,575 B1 | 7/2002 | Czaplicki et al. |
| 6,432,475 B1 | 8/2002 | Yamamoto et al. |
| 6,437,055 B1 | 8/2002 | Moriarity et al. |
| 6,441,081 B1 | 8/2002 | Sadatoshi et al. |
| H2047 H | 9/2002 | Harrison et al. |
| 6,451,231 B1 | 9/2002 | Harrison et al. |
| 6,455,146 B1 | 9/2002 | Fitzgerald |
| 6,479,560 B2 | 11/2002 | Freitag et al. |
| 6,620,501 B1 | 9/2003 | Kassa et al. |
| 2002/0120064 A1 | 8/2002 | Khandpur et al. |
| 2002/0136891 A1 | 9/2002 | Khandpur et al. |
| 2002/0137808 A1 | 9/2002 | Gehlsen et al. |

FOREIGN PATENT DOCUMENTS

| | | | |
|---|---|---|---|
| DE | 3640906 A | * | 6/1988 |
| DE | 196 35 734 A1 | | 4/1997 |
| DE | 299 04 705 Y1 | | 7/1999 |

(List continued on next page.)

OTHER PUBLICATIONS

Japanese Patent No. 56–118816 A (Sep. 1981), Toa Gosei Chemical Industries Limited, abstracts from DWPI and Chemical abstracts.*
"The Epoxy Book", A System Three Resins Publication, pp. 1–41, System Three Resins, Inc., Seattle, Washington, 2000.
"Epoxy Resins", Second Edition Encylcopedia of Polymer Science and Engineering, vol. 6, pp. 322–382, 1985.

Primary Examiner—Robert Sellers
(74) Attorney, Agent, or Firm—Dobrusin & Thennisch PC

(57) ABSTRACT

A synthetic material comprises
a base material providing at least one tacky surface that is tacky at a temperature of less than about 80° C.; and
a powder layered upon the base material which has a substantially non-tacky surface at a temperature of up to about 40° C. and exhibits adhesiveness at a temperature of greater than 120° C. The powder includes one or more correspondence components such as an epoxy resin which is either i) substantially identical to a component of the base material, or ii) the monomer or oligomer configuration of the correspondence component is substantially identical to a component of the base material but may have a greater molecular weight or longer polymer chain structure, or iii) is insubstantially different from a component of the base material (e.g. has the same characteristics and a similar structure but a higher molecular weight).

14 Claims, 1 Drawing Sheet

FOREIGN PATENT DOCUMENTS

| | | |
|---|---|---|
| EP | 0 061 131 | 9/1982 |
| EP | 0 679 501 A1 | 11/1995 |
| EP | 1 208 954 A2 | 5/2002 |
| GB | 2 061 196 A | 5/1981 |
| JP | 01-164867 | 6/1989 |
| JP | 3-247446 A * | 11/1991 |
| WO | WO 93/05103 | 3/1993 |
| WO | WO 97/02967 | 1/1997 |
| WO | WO 97/19124 | 5/1997 |
| WO | WO 98/50221 | 11/1998 |
| WO | WO 98/52997 | 11/1998 |
| WO | WO 99/08854 | 2/1999 |
| WO | WO 99/28575 | 6/1999 |
| WO | WO 99/36243 | 7/1999 |
| WO | WO 99/50057 | 10/1999 |
| WO | WO 99/61216 | 12/1999 |
| WO | WO 99/61281 | 12/1999 |
| WO | WO 00/10802 A1 * | 3/2000 |
| WO | WO 00/37242 | 6/2000 |
| WO | WO 00/38863 | 7/2000 |
| WO | WO 00/40629 | 7/2000 |
| WO | WO 00/46461 | 8/2000 |
| WO | WO 01/57130 | 8/2001 |
| WO | WO 02/26551 A1 | 4/2002 |

* cited by examiner

US 6,811,864 B2

TACKY BASE MATERIAL WITH POWDER THEREON

FIELD OF THE INVENTION

The present invention relates to an improved synthetic material, and articles incorporating the same. More particularly, the present invention relates to a synthetic material having a tacky surface and a non-tacky surface wherein a powder has been disposed upon a base tacky material for forming the non-tacky surface.

BACKGROUND OF THE INVENTION

It is generally known to apply a synthetic material such as an expandable material, a structural material, a foamable material or the like to an article of manufacture for imparting strength, acoustic damping characteristics or the like to the article. Such synthetic materials are frequently used in articles such as buildings, containers, automotive vehicles or the like. For application purposes and for other reasons, it may be desirable for one surface of such a synthetic material to be tacky while another surface of the material is substantially non-tacky. For example, and without limitation, an individual applying a synthetic material to an article typically desires a non-tacky surface appropriate for handling of the synthetic material and a tacky surface for adhering the material to an article. Such synthetic materials, however, can present difficulties. For example, the materials may be difficult to form, may cause substantial amounts of waste or the like. As another example, it may be difficult for the materials to maintain their adhesive properties. Thus, there is a need for a synthetic material having at least one tacky surface and at least one substantially non-tacky surface wherein the material overcomes one or more of the difficulties of prior synthetic materials.

SUMMARY OF THE INVENTION

The present invention is directed to a synthetic material, a method of forming the synthetic material, articles incorporating the synthetic material and methods of applying or using the synthetic material. The synthetic material typically includes a base material that is tacky at a temperature of less than about 80° C. for providing at least one tacky surface. The synthetic material also typically includes a powder layered upon the base material wherein the powder preferably provide a substantially non-tacky surface at a temperature of up to about 40° C. and exhibits adhesivity at a temperature greater than 120° C. In one preferred embodiment, the base material is epoxy-based and the powder includes at least one or more epoxy correspondence components, which correspond to component in the base material.

For one method of use for the present invention, the synthetic material is used to reinforce or provide acoustical damping to a member of an article of manufacture (e.g., an automotive vehicle). According to the method a base material is provided wherein the base material includes primarily epoxy components and is tacky at a temperature of about 23° C. A powder is dispensed upon the base material to form a synthetic material with at least on substantially non-tacky surface and at least one tacky surface. The powder preferably includes primarily epoxy based correspondence components and the powder is preferably substantially non-tacky at a temperature of about 23° C. and exhibits adhesivity at a temperature greater than 80° C. One formed, the synthetic material is applied to a member of an article of manufacture preferably by contacting the substantially non-tacky surface such that the tacky surface is contacted with the member.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE INVENTION

The present invention is predicated upon an improved synthetic material, articles incorporating the material and a method for forming the material. Preferably, the method enables formation of the synthetic material with a tacky surface and a substantially non-tacky surface. It is also preferable for the synthetic material to assist in providing structural reinforcement, adhesion, sealing, acoustical damping properties or a combination thereof within a cavity or upon a surface of one or more structural members (e.g., a body panel or frame member) of an article of manufacture (e.g., an automotive vehicle). The synthetic material may be applied directly to structural members of articles of manufacture or it may be applied to a first member (e.g., a reinforcing member) followed by application of the member and the material to a structural member.

Figure 1:
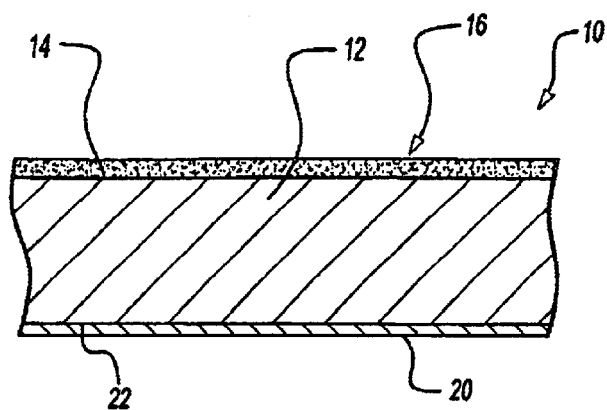
FIG. 1 is a sectional view of an exemplary synthetic material according to one aspect of the present invention.

Generally, the synthetic material of the present invention includes a substantially non-tacky powder that is applied to a tacky base material. This powder is applied to (e.g, layered upon) at least one of a plurality of surfaces of the base material. In this manner, it is possible to form the synthetic material with at least one tacky surface and at least one substantially non-tacky surface. Referring to FIG. 1, there is illustrated an example of a synthetic material 10 according to the present invention. The synthetic material includes a base material 12 and a powder 14 applied thereon for forming a substantially non-tacky surface 16. In the embodiment shown, the synthetic material 10 is layered upon release paper 20 such that a tacky surface 22 of the synthetic material 10 is releasably supported upon the paper 20.

Base Material

Generally speaking, the base material of the present invention is at least partially tacky at room temperature (e.g., about 23° C.) and is also preferably tacky at temperatures between about 0° C. and about 80° C. Additionally, the base material preferably exhibits reinforcement characteristics (e.g., imparts rigity, stiffness, strength or a combination thereof to a member), acoustic characteristics (e.g., absorbs sound), sealing characteristics or other advantageous characteristics. It is also preferable for the base material to be heat activated to expand or otherwise activate and wet surfaces which the base material contacts. After expansion or activation, the base material preferably cures, hardens and adheres to the surfaces that it contacts. It is preferable for the powder to have minimal detrimental effects upon the adhesivity of the base material and it is contemplated that the powder may enhance the adhesivity of the base material.

Depending on the purpose of the synthetic material, it is preferable for base material to exhibit certain characteristics such that some or all of these characteristic may also be exhibited by the synthetic material. For application purposes, it is often preferable that the base material exhibit flexibility, particularly when the base material is to be applied to a contoured surface of an article of manufacture. Once applied, however, it is typically preferable for the base material to be activatable to soften, expand (e.g., foam), cure, harden or a combination thereof. For example, and without limitation, a typical base material will include a polymeric material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the base material may be initially processed as a flowable material before curing. Thereafter, the base material preferably cross-links upon curing, which makes the material substantially incapable of further flow.

In most applications, it is undesirable for the base material to be reactive at room temperature or otherwise at the ambient temperature in a manufacturing environment (e.g. up to about 40° C. or higher). More typically, the base material becomes reactive at higher processing temperatures, such as those encountered in an automobile assembly plant. In such and embodiment, the base material may be foamed upon automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the base material to cause expansion at different temperatures outside the above ranges.

Generally, suitable expandable materials or foams for the base material have a range of expansion ranging from approximately 0 to over 1000 percent. The level of expansion of the material may be increased to as high as 1500 percent or more. Typically, strength is obtained from materials that undergo relatively low expansion while materials intended for acoustic use (e.g., damping) typically undergo greater expansion.

Advantageously, the base material of the present invention may be formed or otherwise processed in a variety of ways. For example, preferred base materials can be processed by injection molding, extrusion, compression molding or with a robotically controlled extruder such as a mini-applicator. This enables the formation and creation of part designs that exceed the capability of most prior art materials.

It is contemplated that the base material may be formed of a variety of materials. For example, and without limitation, the base material may be formed primarily of plastics, thermoplastics, epoxy materials, elastomers and the like or combination thereof.

In one embodiment, the base material may be elastomer-based. In such an embodiment, the base material may include or be primarily composed of elastomers such as natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons, combinations thereof and the like. In one embodiment, recycled tire rubber may be employed. Examples of suitable elastomer-based materials, which may be used as in the base material are sold under the product designations L2701, L2662, L2609 and are commercially available from L&L Products, Romeo, Mich. According to the preferred formulations, the base material includes up to about 30% by weight elastomers, more preferably, up to about 40% by weight elastomers, and even more preferably up to about 60% by weight elastomers. Of course, the preferred amount of elastomer may vary depending upon the desired application of the synthetic material.

In other embodiments, it is contemplated that the base material may be thermoplastic-based. In such an embodiment the base material may include or be primarily composed of thermoplastic materials such as polyamides, polyolefins, polyethylene, polyvinyl chlorides, polyproylene, ethylene copolymers, terpolymers and the like and combinations thereof. According to the preferred formulations, the base material includes up to about 40% by weight thermoplastics, more preferably, up to about 60% by weight thermoplastics, and even more preferably up to about 80% by weight thermoplastics. Of course, like the elastomer formulations, the amount of thermoplastic may vary depending upon the desired application of the synthetic material.

In a highly preferred embodiment, the base material is epoxy-based and includes or is primarily composed of various epoxy containing materials. The base material may be formed from variety of formulations having epoxy material and preferably epoxy resin integrated therein. Epoxy resin is used herein to mean any of the conventional dimeric, oligomeric or polymeric epoxy materials containing at least one epoxy functional group. The epoxy materials may be epoxy containing materials having one or more oxirane rings polymerizable by a ring opening reaction.

The epoxy may be aliphatic, cycloaliphatic, aromatic or the like. The epoxy may be supplied as a solid (e.g., as pellets, chunks, pieces or the like) or a liquid. The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may be modified with butadiene or another polymeric additive. Examples of suitable epoxy-based materials, which may be used as in the base material are sold under the product designations L5020, L5010, L5224, L8000, L5001 and are commercially available from L&L Products, Romeo, Mich. According to preferred formulations, the base material can include up to about 50% by weight epoxy resins, more preferably, up to about 65% by weight epoxy resins, and even more preferably up to about 80% by weight epoxy resins.

In preferred embodiments, a substantial portion of the materials in the base material will typically have molecular weights that are low enough to maintain adhesive capability of the base material. For an elastomer-based or epoxy-based base material, it is preferable for at least about 5% by weight of the elastomer or epoxy materials to have a molecular weight less than about 1000 and more preferably at least about 10% by weight of the elastomer or epoxy materials have a molecular weight less than about 1000. It is also contemplated that, for maintaining adhesive capability, components such as plasticizers or processing oils may be added to elastomer-based or epoxy-based materials and particularly to the thermoplastic-based base material.

As general guidance for the base material, it is preferable that at least 1% by weight of the components have a low enough molecular weight to be a liquid at about 23° C. More preferably, at least 5% by weight of the components have a low enough molecular weight to be a liquid at about 23° C. Still more preferably, at least 10% by weight of the components have a low enough molecular weight to be a liquid at about 23° C.

Powder

Generally, it is desirable for the powder to include components having higher molecular weights than the molecular weights of components in the base material, but similar chemical structures. Such higher molecular weights can assist the powder to be substantially non-tacky at about room temperature (e.g., around 23° C.) and higher temperatures (e.g., up to about 40° C., about 60° C. and even up to about 80° C.). Preferably, however, the powder has some adhesive properties at elevated temperatures such as temperatures greater than about 120° C., more preferably greater than about 140° C. and most preferably greater than 150° C. More specifically, the powder preferably has a glass transition or activation temperature at or near the glass transition temperature or activation temperature of the base material. Thus, the powder may become flowable and combine with the base material such that the powder, the reinforcement material or both can expand and/or adhere to a surface of a structural member. Moreover, the powder is preferably non-inert or reactive (e.g., curable) along with other components of the powder or the base material.

In highly preferred embodiments, the components of the powder include one or a subset of correspondence components. As used herein, correspondence components are polymeric components in the powder that correspond to polymeric components present in the base material. A correspondence component may be a component in the powder that is substantially identical to a component in the base material. For example, the base material may include a bisphenol-A epoxy resin and the powder may include the exact same bisphenol-A epoxy resin as a correspondence component. Alternatively, a correspondence component may be a component of the powder having a substantially identical monomer or oligomer configuration to it corresponding component in the base material, but the correspondence component may have a greater molecular weight or longer polymeric chain structure. As another alternative, a correspondence component may be a component in the powder that is only insubstantially different from its corresponding component in the base material (e.g., exhibits substantially the same characteristics, has at least a similar polymeric structure, but has a higher molecular weight).

It is generally preferable for the powder to include a substantial proportion of correspondence components. In one embodiment, the powder includes at least about 30% by weight correspondence components, more preferably at least about 60% by weight correspondence components and even more preferably at least about 70% by weight correspondence components.

Molecular weights of the correspondence components may vary across a reasonably large range. In a preferred embodiment, the molecular weights of the correspondence components are between about 1000 and about 10,000,000 and is more preferably between about 10,000 and about 1,000,000. One example of suitable elastomeric correspondence component is nitrile rubber such as copolymers of acrylonitrile and butadiene, which may be supplied as a liquid or a solid and which may or may not be carboxylated. Another example of a suitable correspondence component is ethylene propylene diene monomer (EPDM) rubber, which also may be supplied as a solid or a liquid.

In a highly preferred embodiment, the synthetic material includes a base material that is formed of an epoxy-based material and a powder that is formed of an epoxy-based material. In the embodiment, the powder is formed of a combination of two or more of the following components: 1) epoxy resin; 2) thermoplastic (preferably epoxy-based); 3) elastomer-containing adduct; 4) curing agent; 5) catalyst; and 6) curing accelerator. Preferably, the epoxy resin and epoxy-based thermoplastic are of sufficiently high molecular weight to be solid at about room temperature (e.g., about 23° C.). However, a relatively smaller amount (e.g. between about 5% and about 15% by weight of the powder) may initially be provided as a liquid epoxy resin.

Again, epoxy resin is used herein to mean any of the conventional dimeric, oligomeric or polymeric epoxy materials containing at least one epoxy functional group. The polymer-based materials may be epoxy containing materials having one or more oxirane rings polymerizable by a ring opening reaction. According to the preferred formulations, the powder includes between about 30% and about 95% by weight epoxy resins, more preferably, between about 40% and about 85% by weight epoxy resins, and even more preferably between about 50% and about 75% by weight epoxy resins. For epoxy resins powders, correspondence components preferably compose at least about 50% by weight of the powder, more preferably at least about 60% by weight of the powder and even more preferably at least about 70% by weight of the powder.

The epoxy may be aliphatic, cycloaliphatic, aromatic or the like. The epoxy may be supplied as a solid (e.g., as pellets, chunks, pieces or the like) or a liquid. The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. One exemplary epoxy resin may be a phenolic resin, which may be a novalac type or other type resin. Other preferred epoxy containing materials may include a bisphenol-A epichlorohydrin ether polymer, or a bisphenol-A epoxy resin, which may be modified with butadiene or another polymeric additive.

Examples of suitable thermoplastics may include, but are not limited to, polyamides, polyolefins, polyethylene, polyvinyl chlorides, polyproylene, ethylene copolymers and terpolymers, combinations thereof or the like. In one highly preferred embodiment, an epoxy-based thermoplastic such as a polyhydroxyether or phenoxy resin is provided in the powder. According to preferred formulations, the powder includes between about 2% and about 25% by weight thermoplastic resin, more preferably, between about 5% and about 15% by weight thermoplastic resin, and even more preferably between about 9% and about 13% by weight thermoplastic resin.

In a highly preferred embodiment, an elastomer-containing adduct is employed in the powder of the present invention. The epoxy/elastomer hybrid may be included in an amount of up to about 30% by weight of the powder. More preferably, the elastomer-containing adduct is approximately 3% to 20%, and more preferably is about 7% to 13% by weight of the powder. Additionally, the epoxy/elastomer hybrid may be a correspondence component.

In turn, the adduct itself generally includes about 1:5 to 5:1 parts of epoxy to elastomer, and more preferably about 1:3 to 3:1 parts or epoxy to elastomer. The elastomer compound may be any suitable art disclosed elastomer such as a thermosetting elastomer. Exemplary elastomers include, without limitation natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. In one embodiment, recycled tire rubber is employed.

According to the preferred formulations, the powder includes between about 3.0% and about 20.0% by weight curing agents, more preferably, between about 6.0% and about 15.0% by weight curing agents, and even more preferably between about 8.0% and about 10.0% by weight curing agents.

Preferably, the curing agents assist the powder, the reinforcement material or both in curing by crosslinking of the polymers, epoxy resins (e.g., by reacting in stoichiometrically excess amounts of curing agent with the epoxide groups on the resins) or both. Useful classes of curing agents are materials selected from aliphatic or aromatic amines or their respective adducts, amidoamines, polyamides, cycloaliphatic amines, (e.g., anhydrides, polycarboxylic polyesters, isocyanates, phenol-based resins (such as phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. It is also contemplated that curing agent accelerators may be included in the powder.

In various embodiment of the invention, one or more fillers may also be added to the powder including, but not limited to, particulated materials (e.g., powder), beads, microspheres, or the like. Preferably, the filler includes a relatively low-density material that is generally non-reactive with the other components present in the powder. Fillers may be present up to 70% by weight of the powder, but are more preferably between about 15% and about 20% by weight of the powder.

Examples of fillers include silica, diatomaceous earth, glass, clay, nanoclay, talc, pigments, colorants, glass beads or bubbles, glass, carbon ceramic fibers, antioxidants, and the like. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

Additional fillers may include mineral or stone type fillers such as calcium carbonate, sodium carbonate or the like may be used as fillers. In another preferred embodiment, silicate minerals such as mica may be used as fillers.

Other additives may be included in the powder as well such as pigments, dyes or the like. In one preferred embodiment, the powder may include metallic or other components for making the synthetic material appropriate for weld-through operations. Examples of appropriate weld-through assisting additives include powdered carbon or graphite, metal compounds, metallic fibers, iron phosphate or the like. It is additionally contemplated that such weld-through assisting additives may be added to the base material.

Formation

Formation of the powder may be accomplished according to a variety of techniques. According to one technique, the various components are mixed together at elevated temperatures (e.g., between about 80° C. to about 150° C.) in a mixer (e.g., a double arm mixer, a Shaw or Bambury mixer, an extruder or the like). Preferably, the components are mixed, extruded or the like to form the components into substantially homogenous pieces (e.g., chunks, pellets or the like). Thereafter, the pieces are ground into a powder. Grinding of the pieces may be accomplished by various techniques including micro-pulverizing, hammer-milling, jet-milling or the like. The preferred particle size of the powder is between about 10 microns and about 1000 microns, more preferably between about 25 microns and about 500 microns and even more preferably between about 50 microns and 300 microns. Optionally, sieving processes may be employed intermittently or simultaneously with the grinding of the pieces to assure that substantially all the particles are of the desired size.

Once formed, the powder may be applied to the base material to form the synthetic material using a variety of techniques. Depending on how the base material is formed, the powder may be manually, automatically or otherwise applied to the base material. In preferred embodiments, however, the powder is automatically applied or dispensed to the base material by pouring, sifting, straining or the like.

Figure 2:
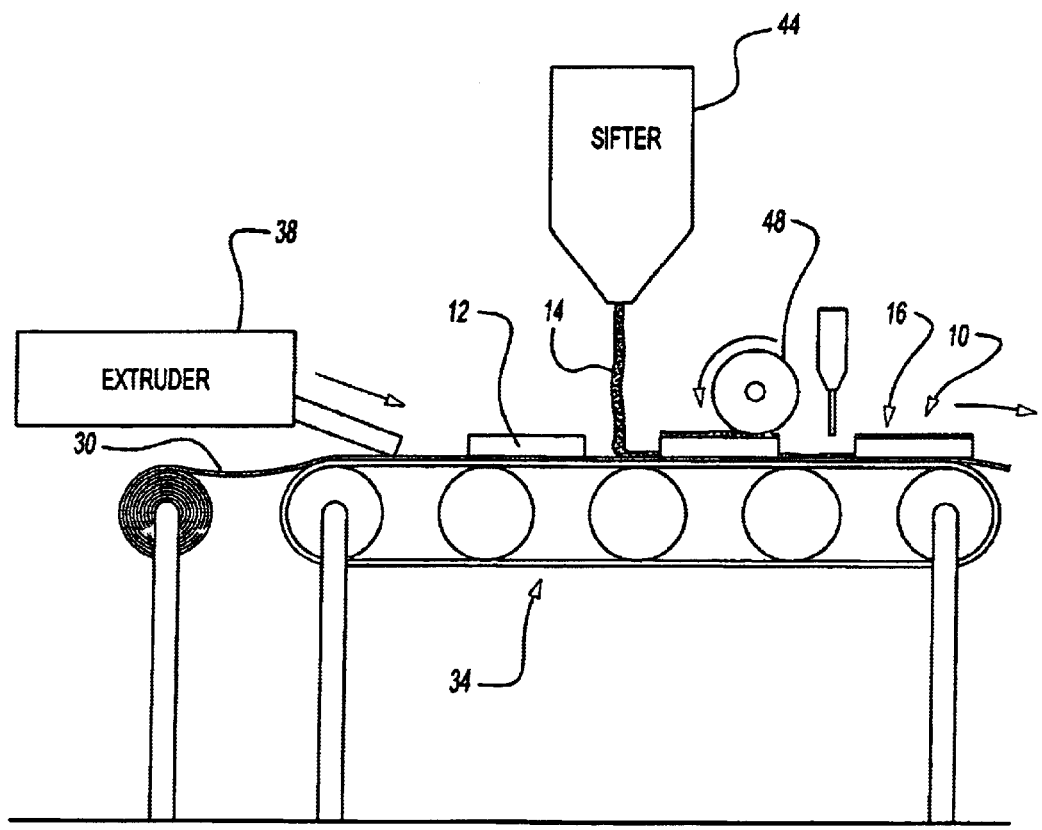
FIG. 2 is a diagram of an exemplary method of forming synthetic material according to another aspect of the present invention.

Referring to FIG. 2, there is illustrated one preferred method of forming the synthetic material 10 of FIG. 1. As shown, the base material 12 is applied (e.g., extruded) onto release paper 30 that is being advanced along a conveyor belt 34. In the embodiment shown, the base material is extruded via a single or twin screw extruder 38, although, the base material 12 may be otherwise applied. The base material 12 may be applied, as desired, in various patterns, shapes or thicknesses onto the release paper 30. Alternatively, the base material 12 may be applied and then die cut or otherwise formed into a desired configuration.

After extrusion, the base material 12 is advanced along the conveyor belt 34 below a sifter 44 from which the powder 14 is poured (e.g., sifted) onto one or more surfaces of the base material 12 thereby forming a layer of the powder 14 on the base material 12. Preferably, a roller 48 or other compression system is provided for pressing the powder 14 into intimate contact with the base material 12 to form the synthetic material 10 such that the powder layer that has been substantially integrated into the base material 12 and such that the layer of powder 14 provide the at least one substantially non-tacky surface 16.

For base material 12 that has been extruded or otherwise formed as desired, one or more surfaces of the base material 12 may be covered (e.g., with release paper or otherwise)

while the powder 14 is applied to all exposed surfaces (e.g., surfaces not contacting the release paper). Advantageously, the powder 14 will then remove at least a substantial portion of the tackiness or pressure sensitivity from each of the exposed surfaces (e.g., including edges of the base material) such that no tacky surfaces are exposed during transport or otherwise prior to application of the synthetic material.

As an added advantage, the powder of the present invention allows for the recycling of the powder, the synthetic material or both. In this regard, a portion of the powder that is applied or dispensed upon the base material may not actually adhere to the base material. Advantageously, such powder may be collected by a vacuum system or otherwise and be reapplied to other base material. Moreover, certain excess portions of the synthetic material, once formed, may be cut away from or otherwise removed from the synthetic material during shaping or further processing of the synthetic material. Advantageously, these excess portions of the material may be recycled by introducing the portions into the extruder or other dispenser and forming more base material therewith. Moreover, the recycling of the synthetic material does not significantly affect the properties of the base material being formed since the powder is only a relatively small proportion of the synthetic material and the powder is preferably formed of a subset of the materials of the base material (e.g., correspondence components).

Application

Generally, the synthetic material is applied to a member of an article of manufacture. The member may be a structural member (e.g., a member designed to withstand various loads) or another member. According to one preferred embodiment, the member may be part of an automotive vehicle. For example, the member might be a frame member, a body member, a bumper, a pillar, a panel, a support structure or the like of an automotive vehicle.

Preferably, the synthetic material is applied directly to a member such that the material can provide reinforcement; acoustic damping, sealing or the like to the member or adjacent members. For application, an individual or machine may remove (e.g., peel) the synthetic material from the release paper to expose its tacky surface. Thereafter, the individual or machine can place the tacky surface in contact with a member to adhere the synthetic material to the member. Once applied, the synthetic material may be activated by heat or otherwise to expand and adhere to adjacent surfaces of various members of the article of manufacture. Advantageously, the non-tacky surface of the synthetic material allows for case of initial contact and subsequent contact (e.g. for repositioning) with the non-tacky surface for application of the synthetic material.

According to an alternative embodiment, the synthetic material may be applied to a first member (e.g., a carrier member) for forming a reinforcement member and then the reinforcement member may be applied to a member of an article of manufacture. In the embodiment, the tacky surface of the synthetic material is adhered to a surface of a carrier member (e.g., a skeleton member) with at least one exposed and preferably substantially non-tacky surface facing at least partially away from the surface of the carrier member thereby forming the reinforcement member. Advantageously, the non-tacky surface can allow for easier placement of the reinforcement member adjacent to a structural member or for easier placement of the reinforcement member within a cavity of the structural member of an article of manufacture since the non-tacky surface does not undesirably adhere to surfaces of the structural member during placement. In a particular preferred embodiment, the carrier member could be formed of injection molded nylon, injection molded polymer, or molded metal (such as aluminum, magnesium, steel and titanium, an alloy derived from the metals, and even a metallic foam).

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A synthetic material comprising:
 a base material that is tacky at a temperature of less than about 80° C., the base material providing at least one tacky surface; and
 a powder layered upon the base material, the powder providing a substantially non-tacky surface at a temperature of up to about 40° C., the powder exhibiting adhesivity at a temperature greater than 120° C.;
 wherein the powder includes one or more epoxy resin correspondence components.

2. A synthetic material as in claim 1 wherein the base material is selected from the group consisting of a thermoplastic-based material, an epoxy-based material and an elastomer based material.

3. A synthetic material as in claim 1 wherein the one or more correspondence components are substantially identical to one or more components in the base material.

4. A synthetic material as in claim 1 wherein the one or more correspondence components represent at least about 60% by weight of the powder.

5. A synthetic material as in claim 1 wherein the one or more correspondence components represent at least about 30% by weight of the powder.

6. A synthetic material comprising:
 a base material that is tacky at a temperature of about 23° C. wherein:
  i) the base material including an epoxy resin; and
  ii) the base material provides at least one tacky surface; and a powder layer on the base material wherein:
   i) the powder provides a substantially non-tacky surface at a temperature of about 23° C.;
   ii) the powder exhibits adhesivity at a temperature greater than 120° C.; and
   iii) the powder includes at least one or more epoxy resin correspondence components.

7. A synthetic material as in claim 6 wherein the one or more epoxy correspondence components are substantially identical to one or more components in the base material.

8. A synthetic material as in claim 7 wherein the one or more correspondence components represent at least about 30% by weight of the powder.

9. A synthetic material as in claim 8 wherein the one or more correspondence components represent at least about 60% by weight of the powder.

10. A synthetic material as in claim 1 wherein the base material is an expandable material.

11. A synthetic material as in claim 1 wherein the base material includes a curing agent.

12. A synthetic material as in claim 1 wherein the base material includes a blowing agent.

13. A synthetic material comprising:
 a base material that is tacky at a temperature of less than about 80° C., the base material providing at least one tacky surface, the base material including a curing agent and a blowing agent; and a powder layered upon the base material, the powder providing a substantially non-tacky surface at a temperature of up to about 40° C., the powder exhibiting adhesivity at a temperature greater than 120° C.;

wherein the powder induces one or more epoxy resin correspondence components and the correspondence components are polymeric components in the powder that correspond to polymeric components present in the base material.

14. A synthetic material as in claim 13, wherein the correspondence components in the powder have a substantially identical monomer or oligomer configuration to the polymeric components in the base material with the exception that the correspondence components in the powder have a greater molecular weight or longer polymeric chain structure than the polymeric components in the base material.

* * * * *